Figure 1:
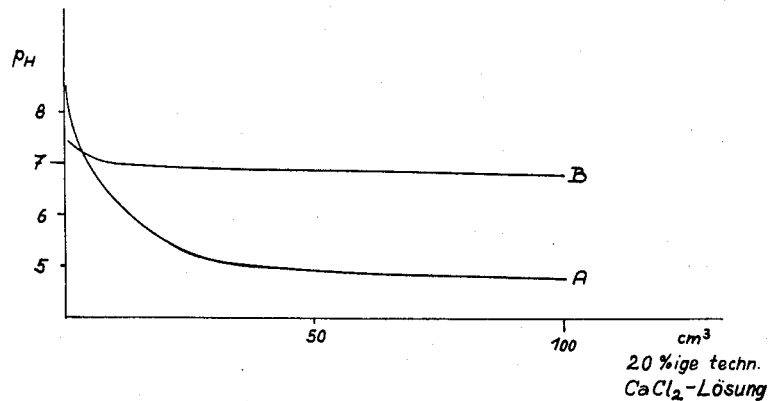

United States Patent Office
2,949,448
Patented Aug. 16, 1960

2,949,448

NEUTRALIZING LIGNIN-CONTAINING LIQUORS

Otmar Töppel, Aschaffenburg, Germany, assignor to Firma Aschaffenburger Zellstoffwerke A.G., Redenfelden, Upper Bavaria, Germany Filed June 15, 1954, Ser. No. 436,877

Claims priority, application Germany June 23, 1953

5 Claims. (Cl. 260—124)

The present invention relates to a method of neutralizing lignin-containing liquors and more particularly to the neutralizing of fermented or unfermented sulfite waste liquors which have undergone alkaline and possibly oxidizing treatment whereby substantially neutral liquors are obtained.

Methods are known of producing various phenols, with or without other functional groups, for example —CHO, —COOH, —OCH$_3$, —COCH$_3$, —SO$_3$H and like groups, from lignin, lignin derivatives, or materials containing lignin, and the like, by oxidation in a strongly alkaline medium, depending on the selection of the reaction conditions. In almost all methods which have acquired industrial importance, the operation is based on a common principle; sulfite waste liquors or the like are reacted with caustic alkalis or caustic lime, or mixtures of the two, at high temperatures, and if desired with the application of pressure, oxidizing media, and special catalysts. The reaction products are generally removed from the strongly alkaline reaction solutions obtained in this manner, after correction, neutralization, or acidification, by means of extraction, precipitation, or the like. Since relatively large amounts of bases and acids are necessary in order to carry out these operations, the economy of all methods depends largely on the cost of the chemicals.

For this reason, various possible methods of reducing the cost of the chemicals used have been proposed. Thus, for example, a mixture of sodium sulfate and calcium hydroxide has been recommended as a less expensive base. For plants connected to cellulose factories, it was a particularly self-suggesting step to use the less expensive sulfur dioxide or carbon dioxide for the same purpose, instead of the expensive hydrochloric acid or sulfuric acid previously used. Whereas in the latter cases any desired pH value between 12 and 1 can be adjusted, CO$_2$ neutralization leads practically only to the bicarbonate stage, which usually corresponds to a pH value of at the lowest 7.5.

The solutions neutralized with carbon dioxide are moreover not stable, so that the pH value is shifted into higher pH ranges when left standing, and more rapidly when heated, whereby working up by extraction, precipitation, and the like is rendered difficult, if not completely impossible.

In order to obtain economical isolation conditions for the products formed, however, lower pH values than 7.5 are usually necessary. If it is attempted to obtain these lower pH values by adding mineral acids, an intense generation of CO$_2$ and frothing are observed. The consumption of acid is then practically just as high as if the liquor had been treated directly with mineral acid. CO$_2$ neutralization therefore does not bring about any reduction of the cost of the method.

It is therefore a primary object of the present invention to provide a process of neutralizing lignin-containing liquors to a pH of about 7 or less in an economical and easily controllable manner.

It is another object of the present invention to provide a process of neutralizing lignin-containing liquors which have first been pre-neutralized with carbon dioxide.

It is still another object of the present invention to provide a method of neutralizing lignin-containing liquors to a pH between 7.0–6.0 by the use of substances which result in such neutralization whereby, due to the use of such substances for the neutralization, an excess of the substance does not result in too low a pH.

Other objects and advantages of the present invention will be apparent from a further reading of the specification and of the appended claims.

The present invention is based upon the surprising discovery that instead of using a mineral acid to reduce the pH of the lignin-containing liquor to about 7.0 or less, small amounts of inorganic salts which are hydrolytically split in water to give an acid reaction may be utilized with excellent results.

With the above objects in view, the present invention mainly comprises a process of neutralizing lignin-containing liquors, the step of adding to an aqueous lignin-containing liquor having a pH of at least 7.5 at least one inorganic salt which upon hydrolysis in aqueous solution has an acid reaction in an amount sufficient to lower the pH of the lignin-containing liquor to at least 7.0, thereby neutralizing the liquor.

The process of the present invention is applicable to any alkaline liquors containing lignin, lignin derivatives and substances containing lignin. More particularly the process of the present invention is applicable to fermented or unfermented sulfite waste liquors which have undergone alkaline and possibly oxidizing treatment.

Although the present invention is applicable to the use of any inorganic salt which in aqueous solution gives an acid reaction, e.g. non-alkali metal salts of strong mineral acids, it is most preferred to utilize chlorides of calcium, magnesium and chlorides and sulfates of aluminum, e.g. MgCl$_2$, CaCl$_2$, AlCl$_3$, Al$_2$(SO$_4$)$_3$.

The process of the present invention is particularly applicable to alkaline liquors containing lignin which have been pre-neutralized with CO$_2$, whereby the pre-neutralized liquor is treated with the salts. Where the alkaline liquor has not been pre-neutralized, it is preferred to utilize aluminum chloride or aluminum sulfate as the salt for the one step neutralization of the liquor.

If, liquor pre-neutralized with CO$_2$ is further treated with, for example, solutions of 20% strength of calcium chloride (industrial 70% strength), the unforeseeable quasi-buffering action of the lyes results in the obtaining of solutions, capable of being worked up, of any desired pH value between 7 and 6 (curve B in Figure 1), the pH value of which substantially does not change when allowed to stand or when heated, with the development of CO$_2$, in contradistinction to liquor neutralized only with CO$_2$.

There phenomena, which can be industrially utilized with great advantage, occur however only in the presence of material containing lignin. If the same experiments are carried out with model substances, but potentiometrically titrating on the glass electrode an industrial sodium bicarbonate solution of 7.5% concentration with a calcium chloride solution of 20% concentration (industrial 70% strength), a relatively sharp decline of the pH value to pH=5 (curve A in Figure 1) is observed.

It is further seen from the curve (curve B, Figure 1) that the neutralization method of the present invention is highly insensitive to overdosing of the neutralization medium. Other advantages are however also possessed by the new method of working.

In the previous neutralization method using mineral acids or carbon dioxide alone, a quantity of colloidal to coarsely dispersed depositions, which can be removed only with difficulty, are obtained, which through their action of promoting the formation of emulsions and suspensions are found very disturbing in the working up of the liquors. It has been found particularly advantageous according to the invention that in the new method all these substances and also the disturbing salts of the sulphurous acid are precipitated in forms readily removable. After the liquors treated in this manner have been allowed to stand for some time, a thick lignin mud is precipitated, which is advantageously subjected to further alkaline treatment. In addition, the liquors worked up in this manner, after removal of the residual dissolved lignin, can be regenerated to the respective metal hydroxides already in the liquid phase, so that they can be recycled.

The following examples are given as illustrative of the process of the present invention, the scope of the invention not however being limited to the specific details of the examples.

Example 1

500 cc. of a sulfite waste liquor which has undergone alkaline treatment are pre-neutralized with $CO_2$ to a pH value of 8.8 and after-neutralized with an industrial $CaCl_2$ solution of 25% concentration. For this purpose 25 g. of $CaCl_2$ are required which corresponds to a consumption of 50 kg. of $CaCl_2$ per cubic meter. The precipitates produced are removed and afterwards, the lignin sludge separated after standing for some time, is drawn off.

Example 2

500 cc. of a liquor are pre-neutralized with $CO_2$ to a pH value of 7.5 and after-neutralized with an industrial $CaCl_2$ solution of 20% concentration. 11 g. of $CaCl_2$ are needed, i.e. 22 kg. of $CaCl_2$ per cubic meter. The further working up of the liquor is carried out in known manner.

Example 3

By adding 250 cc. of an industrial $MgCl_2$ solution of 25% strength, a liquor which had been pre-neutralized with $CO_2$ to a pH of 7.8, is adjusted to a pH of 7.1. During this operation no particularly perceptible formation of deposits of inorganic constituents is observed. The relatively high salt content entailed by this phenomenon permits the working up of the neutralized liquor by extraction in a particularly advantageous manner.

Example 4

500 cc. of a liquor saturated with $CO_2$ are adjusted to pH 7 with a solution of 200 g. of $Al_2(SO_4)_3 \cdot 18H_2O$ in 1000 cc. of water. The results can be seen in Figure 2, curve A.

The further working up is carried out as in Examples 1 and 2.

Example 5

Figure 2:
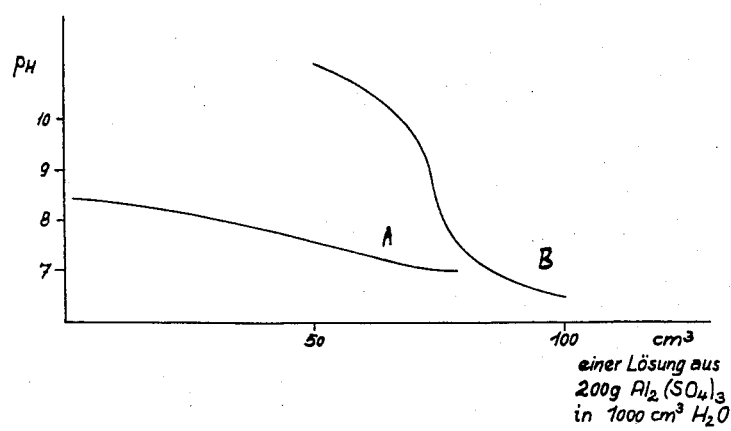

A liquor of the same origin, but not pre-neutralized with $CO_2$, is titrated directly with the aluminum sulfate solution mentioned in Example 4. The results are shown in Figure 2, curve B. Lignol liquor can thus be neutralized directly with aluminum sulphate, or with other aluminum salt solutions having an acid reaction to hydrolysis. Since when working in this manner particularly large amounts of deposits are formed, the neutralized liquor is very suitable for working up by precipication operations.

Example 6

A repetition of the preceding experiment, utilizing 500 cc. of a lye, shows a consumption of 460 cc. of an industrial aluminum sulphate solution of 20% concentration, i.e. 180 kg. of industrial aluminum sulfate per cubic meter. Further working up takes place as indicated in Example 5.

Example 7

250 cc. of a liquor, pre-neutralized by $CO_2$ to a pH of 8.5, is adjusted to a pH of 7.05 by addition of 40 cc. of an industrial aluminum sulfate solution of 20% concentration and the reaction mixture is worked up in known manner.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process of neutralizing lignin-containing liquors, the steps of pre-neutralizing an alkaline waste sulfite liquor which has undergone alkaline treatment and which contains lignin with carbon dioxide so as to lower the pH of said liquor to a value of at least 7.5; and adding to the thus pre-neutralized liquor at least one inorganic salt which upon hydrolysis in aqueous solution has an acid reaction and being selected from the group consisting of calcium chloride, magnesium chloride, aluminum chloride and aluminum sulfate in an amount sufficient to lower the pH of said lignin-containing liquor to a maximum value of 7.0, thereby neutralizing said liquor.

2. In a process of neutralizing lignin-containing liquors, the steps of pre-neutralizing an alkaline waste sulfite liquor which has undergone alkaline treatment and which contains lignin with carbon dioxide so as to lower the pH of said liquor to approximately 7.5; and adding to the thus pre-neutralized liquor at least one inorganic salt which upon hydrolysis in aqueous solution has an acid reaction and being selected from the group consisting of calcium chloride, magnesium chloride and aluminum chloride and aluminum sulfate in an amount sufficient to lower the pH of said lignin-containing liquor to between 7.0–6.0, thereby neutralizing said liquor.

3. In a process of neutralizing lignin-containing liquors, the steps of pre-neutralizing an alkaline waste sulfite liquor which has undergone alkaline treatment and which contains lignin with carbon dioxide in an amount sufficient to lower the pH of said liquor to between 7.5 and 8.8; and adding to the thus pre-neutralized liquor at least one inorganic salt which upon hydrolysis in aqueous solution has an acid reaction and being selected from the group consisting of calcium chloride, magnesium chloride, aluminum chloride and aluminum sulfate in an amount sufficient to lower the pH of said lignin-containing liquor to a maximum value of 7.0, thereby obtaining a neutralized buffered liquor.

4. In a process of neutralizing lignin-containing liquors, the steps of pre-neutralizing an alkaline waste sulfite liquor which has undergone alkaline treatment and which contains lignin with carbon dioxide in an amount sufficient to lower the pH of said liquor to between 7.5 and 8.8; and adding to the thus pre-neutralized liquor at least one inorganic salt which upon hydrolysis in aqueous solution has an acid reaction and being selected from the group consisting of calcium chloride, magnesium chloride, aluminum chloride and aluminum sulfate in an amount sufficient to lower the pH of said lignin-containing liquor to between 7.0 and 6.0, thereby obtaining a neutralized buffered liquor.

5. In a process of neutralizing lignin-containing liquors, the steps of pre-neutralizing an alkaline waste sulfite liquor which has undergone alkaline treatment and which contains lignin with carbon dioxide in an amount sufficient to lower the pH of said liquor to between 7.5 and 8.8; adding to the thus pre-neutralized liquor at least one inorganic salt which upon hydrolysis in aqueous solution has an acid reaction and being selected from the group consisting of calcium chloride, magnesium chloride, aluminum chloride and aluminum sulfate in an amount sufficient to lower the pH of said lignin-containing liquor to a maximum value of 7.0, thereby obtaining a neutralized buffered liquor; allowing the thus neutralized liquor to stand whereupon settling of formed precipitates occurs; separating the insolubles from said neutralized liquor; evaporating the solvent from the thus obtained solution, thereby recovering metal salts; and converting the thus obtained metal salts by causticization to the corresponding metal hydroxide.

References Cited in the file of this patent

UNITED STATES PATENTS

| | | |
|---|---|---|
| 1,043,303 | Dickerson | Nov. 5, 1912 |
| 2,441,243 | Romer | Jan. 9, 1923 |
| 2,241,306 | Honig | May 6, 1941 |
| 2,406,867 | Tomlinson et al. | Sept. 3, 1946 |

FOREIGN PATENTS

| | | |
|---|---|---|
| 100,596 | Great Britain | May 30, 1916 |